(No Model.)
M. W. DEWEY.
ELECTRIC HEATING APPARATUS.
No. 449,404. Patented Mar. 31, 1891.
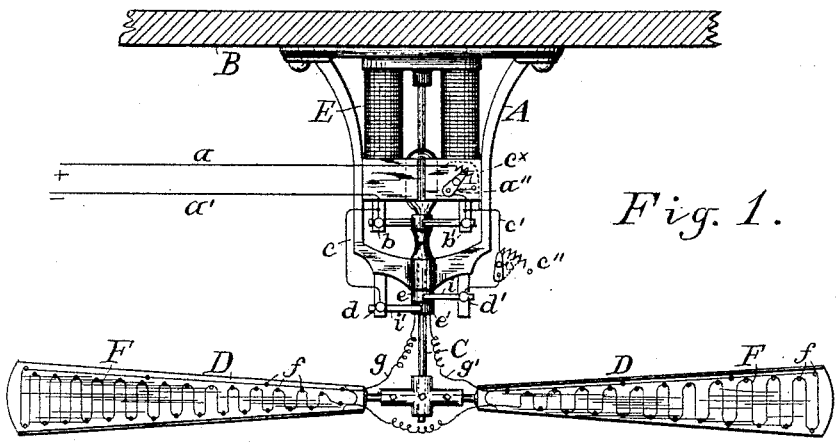
Fig. 1.
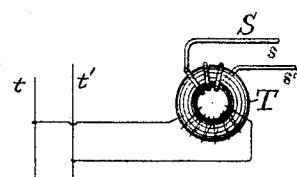
Fig. 2.
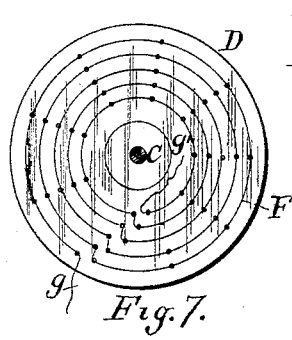
Fig. 7.
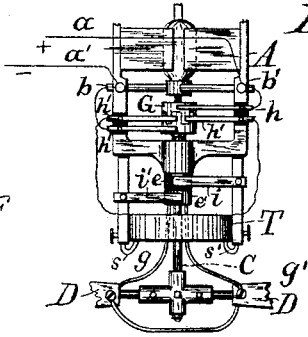
Fig. 3.
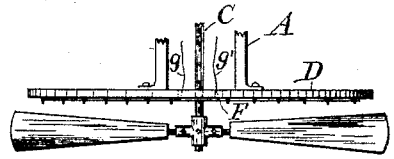
Fig. 8.
Fig. 4.
Fig. 5.
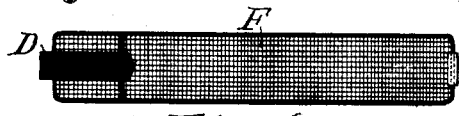
Fig. 6.
WITNESSES:
J. J. Laass
H. M. Seaman
INVENTOR,
Mark W. Dewey,
BY
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRIC HEATING APPARATUS.

SPECIFICATION forming part of Letters Patent No. 449,404, dated March 31, 1891.

Application filed April 28, 1890. Serial No. 349,794. (No model.)

*To all whom it may concern:*

Be it known that I, MARK W. DEWEY, of Syracuse, in the county of Onondaga, in the State of New York, have invented new and useful Improvements in Electric Heating Apparatus, (Case No. 58,) of which the following, taken in connection with the accompanying drawings, is a full, clear, and exact description.

My invention relates to electric heating apparatus; and the object is to rapidly radiate or diffuse the heat from the heat-developing electric conductors or resistances, so that the apparatus may be able to supply more heat and the heat distributed evenly throughout the apartment or room in which the apparatus is located. To accomplish this my invention effectively, I combine an electric heater with a suitable ventilating-fan operated by a motor of any desired construction, but preferably an electric motor, to displace or remove the heated air from the heater.

In order to carry out my invention, I preferably mount exposed heat-developing electric conductors or resistances upon the blades of a ventilating-fan or construct the blades of a fan of an electric heat-developing conductor as hereinafter fully described, and specifically set forth in the claims.

Referring to the drawings, Figure 1 is a side view of a combined electric heater and ventilating-fan suspended from the ceiling. Fig. 2 is a diagram of electric circuits when a source of alternating current is employed and a portion of the current is transformed into a heating-current. Fig. 3 is a side view of a portion of another fan having a pulsator to break up the current and operated by the electric motor running the fan when a source of direct current is transformed for the heater. Figs. 4, 5, and 6 are different forms of fan-blades that may be employed, and Figs. 7 and 8 represent modifications of apparatus for carrying out my invention.

Like letters of reference indicate corresponding parts.

Specifically referring to said drawings, A is the frame, fixed to the ceiling B and supporting the shaft C, from which the blades D D are extended, and a small electric motor E to rotate the said shaft and blades.

I do not limit myself to the employment of an electric motor or to the employment of a separate motor for each fan, as any suitable motor may be employed and arranged to operate several fans, if desired, in the usual and well-known manner.

$a$ and $a'$ are electric conductors, which may extend from any suitable source of electricity to the terminals $b$ and $b'$ of the motor E, and $a''$ is an adjustable resistance in the conductor $a$ to control the current.

$c$ and $c'$ are the conductors of a branch circuit connecting the conductors $a$ and $a'$ to the terminals $d$ and $d'$, and $c''$ is an adjustable resistance and circuit maker and breaker in the conductor $d'$ to control the current flowing to the heater F, mounted upon the blade or blades D of the fan. Instead of connecting the conductor $c'$ to the conductor $a$ between the terminal $b'$ and the adjustable resistance $a''$, said conductor may be connected as shown by the dotted line $c^\times$.

The heater F (shown in Fig. 1) is formed of a serpentinely-shaped wire of suitable metal fixed by pins $f$ to the sides of the blades, formed, preferably, of insulating material.

In order to convey the electricity from the stationary terminals $d$ and $d'$ to the rotary heater or blades of the fan, I fix two insulated metallic rings $e$ and $e'$ upon the shaft C between said terminals, so that they will revolve with the shaft, and extend metallic fingers or brushes $i$ and $i'$ from the said terminals to the rings to bear with their free ends upon the peripheries thereof, brush $i$ bearing upon ring $e$ and $i'$ upon ring $e'$. From these rings electric conductors $g$ and $g'$ extend to the blades D D. If heat is not desired, the circuit to the heater F may be opened by means of the circuit-breaker $c''$, and the fan may be rotated without supplying heat.

When the source of electricity is of an alternating character, an alternating-current motor may be employed, and if it is desired to transform the current for the heater into a current of greater volume an inductional transformer T may be connected in circuit, as shown in Fig. 2, and the terminals $s$ and $s'$ of its secondary circuit connected to the heater F through the terminals $d$ and $d'$ and brushes, rings, &c. In this case the terminals $t$ and $t'$ should be led to the terminals of the alternating-current motor.

Should the source of electricity be direct and it is desired to transform a portion of it for the heater, the same may be done by placing a pulsator G, preferably of the alternating type, as shown, in circuit with the transformer T, as shown in Fig. 3 of the drawings. The said alternator is placed upon but insulated from the shaft C of the fan and is rotated with the latter. The current is led to and from the alternator by means of metallic brushes $h\ h$ and $h'\ h'$, fixed to but insulated from the frame A and bearing with their free ends upon the periphery of said alternator. Conductors extend from the brushes $h'\ h'$ to the inductional transformer T, also supported by the frame A, and the terminals $s\ s'$ of the secondary circuit are connected to the brushes $i$ and $i'$ through the parts of the frame supporting said brushes and transformer, and thence to the heating-conductor F through the brushes $i$ and $i'$, rings $e$ and $e'$, and conductors $g$ and $g'$, as before described.

Fig. 4 shows a side and edge view of a heat-developing electric conductor F, consisting of a broad thin strip of metal, as iron or copper, formed around and on both sides of a blade of insulating material D. This strip of metal is of uniform width and thickness throughout, and therefore is not as wide as the widest end of the blade D.

If it is desired to have the heating-conductor correspond in width to that of the blade, it may be done and the resistance kept uniform throughout its length by tapering the metal strip toward its middle or widest part, as shown in Fig. 5. This form of heating-conductor will afford a greater radiating-surface. In some cases I prefer, however, to perforate or construct the blades of wire-netting upon an insulated frame, as shown in Fig. 6, so that there will be less displacement of air in the apartment when the fan is rotated; but this may be effected, also, by setting the fan-blades differently in their sockets or turning them so that there will be less air-resistance when they are rotated.

Instead of suspending the fan from the ceiling, it may stand upon the floor or be fixed to the side wall of the room, as desired.

I do not limit myself to a fan, as the purpose of the invention may be accomplished by various other means—as, for instance, a rotating disk having the heat-developing electric conductor F mounted upon it, as shown in Fig. 7. D represents, preferably, a disk of insulating material to be rotated by the shaft C, and F is the heat-developing conductor mounted upon the disk. Neither do I limit myself to an apparatus that moves the heating-conductor, as the latter may be held stationary in proximity to a fan or apparatus for displacing the air, as shown in Fig. 8 of the drawings. In the last figure, D represents a disk having a heating electric conductor mounted upon it, as shown in Fig. 7, and supported by the frame A of a fan and above the fan-blades, so that the heat developed by the conductor F will be rapidly diffused or carried from said conductor when the fan is moved or rotated.

Having described my invention, what I claim as new, and desire to secure by Letters Patent, is—

1. The combination of an exposed electric heater and a ventilating-fan mounted upon the same support or frame.

2. The combination of a ventilating-fan and an electric heater mounted upon and carried by said fan.

3. The combination of an electric heater and a motor connected therewith to move the same.

4. The combination of an electrically-heated conductor and a blade of a ventilating-fan to carry said conductor.

5. The combination, with a ventilating-fan and a motor to operate the same, of an electrically-heated conductor mounted upon the blades of said fan.

6. The combination, with a rotary ventilating-fan and a motor to operate the same, of an electrically-heated conductor mounted upon said fan.

7. In an electric heating apparatus, one or more exposed heat-developing electric conductors suitably supported to be moved and a motor connected to said conductors to move the same.

8. In an electric heating apparatus, one or more heat-developing electric conductors suitably supported to be rotated and connected in circuit with a source of electricity and a motor connected to and arranged to rotate said conductors, for the purpose described.

9. The combination of a perforated or open-work fan-blade, a heating-conductor, and an electric conductor connected with the same.

10. The combination of a fan-blade constructed of perforated or open-work electric conducting material, and electric conductors connecting said blade with a suitable source of electricity.

11. The combination, with a ventilating-fan, a motor to operate the same, and an electric heater mounted thereon, of an inductional transformer, a secondary circuit of said transformer connected with the heater, a pulsator in the primary circuit, operated by the motor operating the fan, and a source of direct current for the primary circuit.

12. The combination, with a ventilating-fan, a motor to operate the same, and an electric heater mounted thereon, of an inductional transformer, a secondary circuit of said transformer connected with the heater, and a source of electricity for the primary circuit.

13. In an electric heating apparatus, one or more heat-developing electric conductors and a movable means to displace or remove the heated air from said conductor or conductors.

14. In an electric heating apparatus, one or more exposed heat-developing electric conductors, means to displace or remove the heated air from said conductor or conductors, and means for controlling the current passing through said conductor or conductors and the removal of air therefrom independently of each other.

15. The combination of an electric heater, an electric motor supplied with means for removing the heat from said heater, and electric conductors connected to both the heater and motor to supply electricity thereto.

In testimony whereof I have hereunto signed my name this 25th day of April, 1890.

MARK W. DEWEY. [L. S.]

Witnesses:
 C. H. DUELL,
 H. M. SEAMANS.